July 5, 1927.
A. A. SUNDE
1,635,017
ANTISKID DEVICE
Filed April 21, 1926
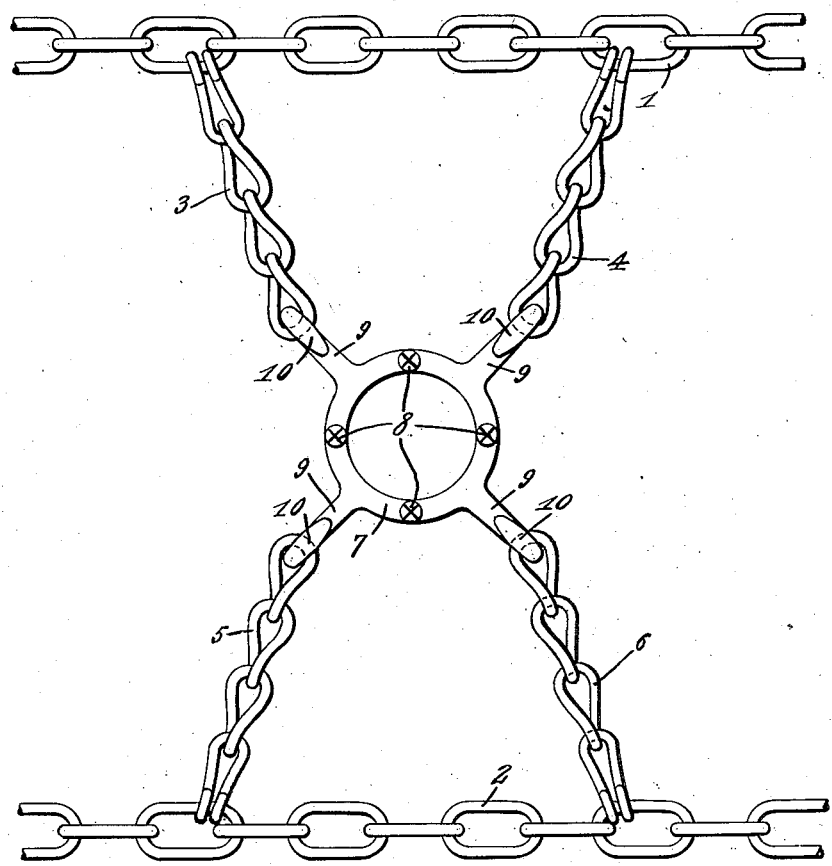
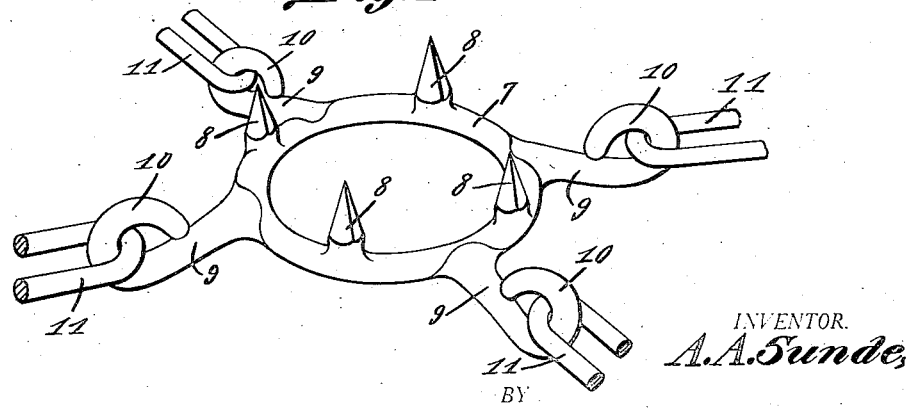
INVENTOR.
A. A. Sunde,
BY
Geo. P. Kimmel.
ATTORNEY Patented July 5, 1927.

1,635,017

UNITED STATES PATENT OFFICE.

APSALON A. SUNDE, OF UTE, IOWA.

ANTISKID DEVICE.

Application filed April 21, 1926. Serial No. 103,538.

This invention relates to an anti-skid device for use in connection with tire chains carried by motor vehicle wheels, and has for its object to provide, in a manner as hereinafter set forth, a device of said class for application to a tread of a tire to prevent skidding or slipping of a vehicle during the travel thereof, especially over frozen surfaces.

Further objects of the invention are to provide, in a manner as hereinafter set forth, an anti-skid device which is simple in its construction and operation, strong, durable, compact, thoroughly efficient in its use, capable of being installed in connection with the forms of tire chains now in general use, thoroughly efficient when used, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:—

Figure 1 is a fragmentary view, in plan, of a tire chain, showing the adaption thereof an anti-skid device in accordance with this invention.

Figure 2 is a perspective view illustrating the anti-skid device.

Referring to the drawings in detail 1 and 2 indicate a pair of side chains or carriers which are adapted to be positioned at the sides of a wheel as is well known. Extending from the chain 1, as well as being coupled therewith, is a pair of tread chain sections 3, 4. Extending from the side chain 2 is a pair of tread chain sections 5, 6. The tread chain sections are adapted to be coupled together by an anti-skid device in accordance with this invention and when so coupled the device will be positioned at the longitudinal center of the outer face of the tread of the tire.

The anti-skid device, in accordance with this invention, preferably is stamped from a solid piece of steel, but it is to be understood that it can be manufactured in any desired manner, and it comprises a circular body portion 7, preferably circular in cross section, and having projecting from the outer face thereof a series of spaced tapered calks of appropriate length. Preferably the calks 8 are spaced equi-distant with respect to each other and as shown the body portion 7 is provided with four calks 8, but it is to be understood that the number can be increased or diminished. Each of the calks is formed with a cylindrical base flush with the inner and outer side edges of the cylindrical body portion 7 and the latter is in the form of an annulus.

Formed integral with and projecting outwardly from the outer edge of the body portion 7 is a series of radially disposed coupling members 9 of cylindrical cross section and of hook-like form and which correspond in number to the number of tread chain sections. Each of the coupling members 9 at its outer portion is formed with an inturned bill 10 for connection with a link 11 of a tread chain section. The free end of the bill 10, of each coupling member 9, is arranged exteriorly of and spaced from the outer side edge of the body portion.

When the anti-skid device is positioned with respect to the tire the tread chain sections are connected together in a manner as shown in Figure 1 and the anti-skid device is positioned between the inner ends of the said tread chain sections.

When the anti-skid device, is set up with respect to the tire chain, it will act to prevent the slipping or skidding of the vehicle wheel, when the vehicle is travelling especially over a frozen surface, and furthermore the calks will aid to grip the surface over which the vehicle is travelling, and therefore it is thought that the many advantages of an anti-skid device in accordance with this invention can be readily understood, and although the preferred embodiment of the invention is as illustrated and described, yet it is to be understood that changes in the details of construction can be had which will fall within the scope of the invention as claimed.

What I claimed is:

An anti-skid device comprising a body portion in the form of an annulus of cylindrical cross section, a series of spaced tapered calks formed integral with and disposed at right angles to the outer face of said annulus, and a series of radially disposed coupling members formed integral with the outer side edge of said annulus and of cylindrical cross section, each of said coupling members having the outer portion thereof inturned upon itself to provide a bill spaced from and arranged exteriorly of the outer side edge of said annulus, said coupling members providing means for connecting said body portion with a series of tread chain elements to position the body portion centrally of the tread of a tire, said coupling members alternately disposed with respect to said calks and arranged in pairs, the coupling members of each pair being oppositely disposed with respect to each other and extending in the same plane.

In testimony whereof, I affix my signature hereto:

APSALON A. SUNDE.